(12) United States Patent
Ohe et al.

(10) Patent No.: US 7,080,944 B2
(45) Date of Patent: Jul. 25, 2006

(54) PLUG AND RECEPTACLE FOR OPTICAL CONNECTOR, OPTICAL CONNECTOR, AND ELECTRONIC EQUIPMENT

(75) Inventors: Nobuyuki Ohe, Nara-ken (JP); Kazuhito Nagura, Kashihara (JP); Motoki Sone, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/885,668

(22) Filed: Jul. 8, 2004

(65) Prior Publication Data
US 2005/0008299 A1    Jan. 13, 2005

(30) Foreign Application Priority Data
Jul. 10, 2003  (JP)  ............. P2003-272788

(51) Int. Cl.
*G02B 6/36*  (2006.01)
(52) U.S. Cl. ........................ 385/76; 385/139
(58) Field of Classification Search ............. 385/139
See application file for complete search history.

(56) References Cited

U.S. PATENT DOCUMENTS

| | | | |
|---|---|---|---|
| 5,764,834 A * | 6/1998 | Hultermans | 385/60 |
| 6,464,408 B1 * | 10/2002 | Nolan | 385/87 |
| 6,481,902 B1 * | 11/2002 | Takaoka et al. | 385/92 |
| 6,599,027 B1 * | 7/2003 | Miyake et al. | 385/78 |
| 6,688,780 B1 * | 2/2004 | Duran | 385/76 |
| 2002/0159716 A1 | 10/2002 | Ohbayashi et al. | |
| 2003/0007762 A1 * | 1/2003 | Shimada et al. | 385/128 |

FOREIGN PATENT DOCUMENTS

| | | |
|---|---|---|
| CN | 1366622 A | 8/2002 |
| CN | 2508255 Y | 8/2002 |
| JP | 2000-131564 A | 5/2000 |
| JP | 2000131564 * | 5/2000 |
| JP | 2002-48952 A | 2/2002 |

OTHER PUBLICATIONS

"DIY products, OPB-41, circular plug (for φ 4.0 mm cord)," Horizon Tec Co., Ltd., online, searched Jul. 1, 2004.

* cited by examiner

Primary Examiner—Michelle Connelly-Cushwa
Assistant Examiner—Chris Chu
(74) Attorney, Agent, or Firm—Birch, Stewart, Kolasch & Birch, LLP

(57) ABSTRACT

In order to be usable in combination with various receptacles without drawbacks, a plug for an optical connector has a plug tip section defining an optical reference plane that is to coincide with an optical reference plane in a receptacle, and at distances behind the optical reference plane with respect to an insertion direction, the plug has a first mechanical reference plane that is able to be brought into contact with an element within the receptacle, and a second mechanical reference plane that is able to be brought into contact with a front of the receptacle.

15 Claims, 11 Drawing Sheets

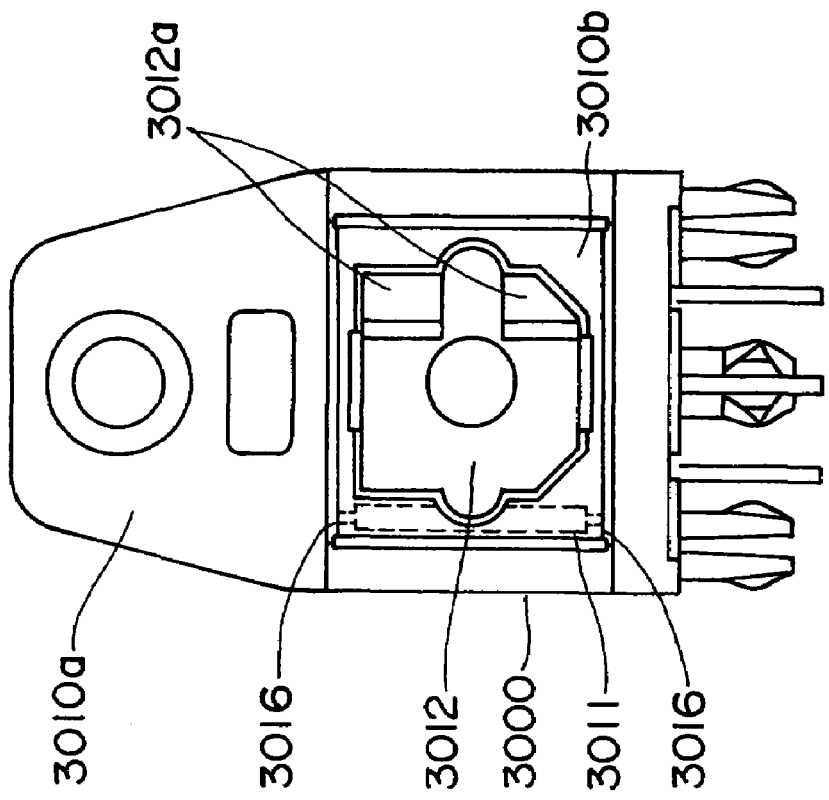
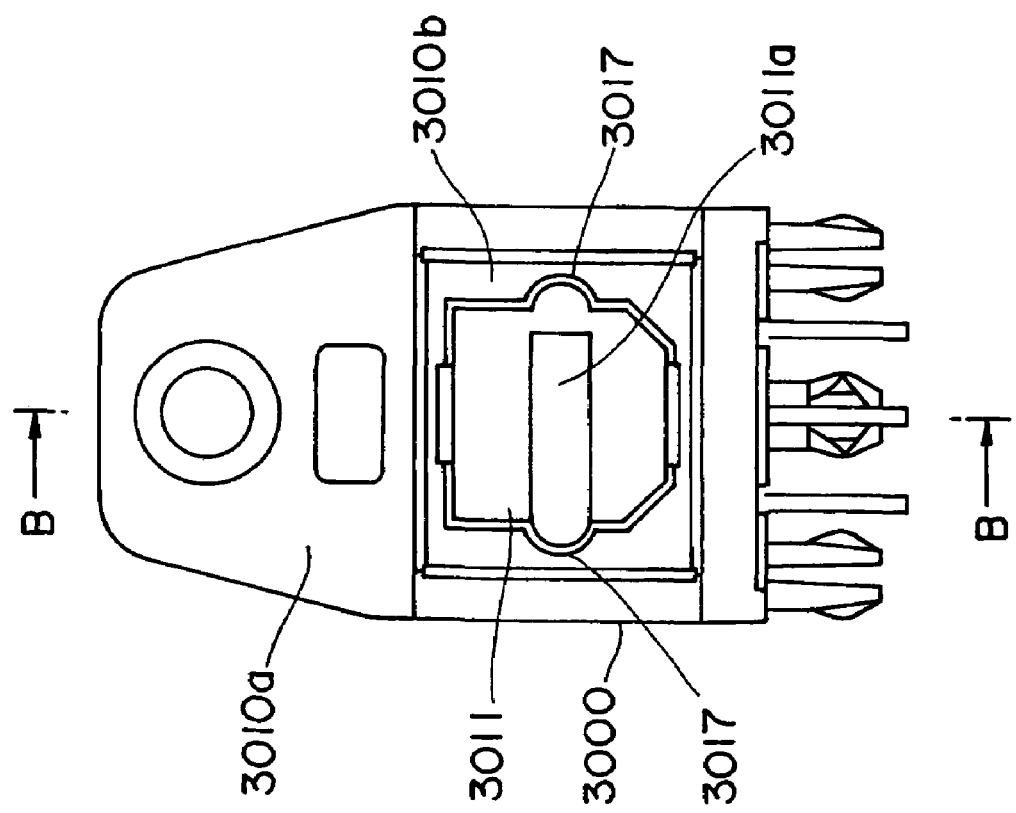

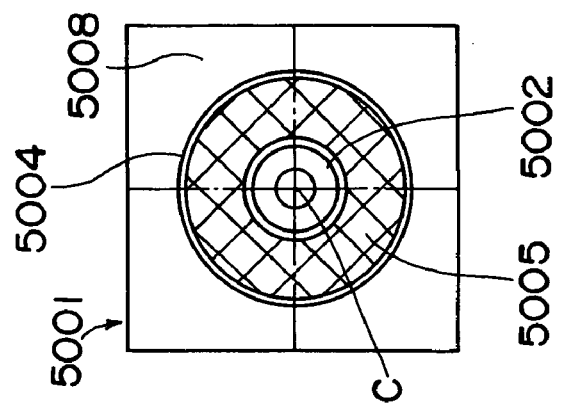
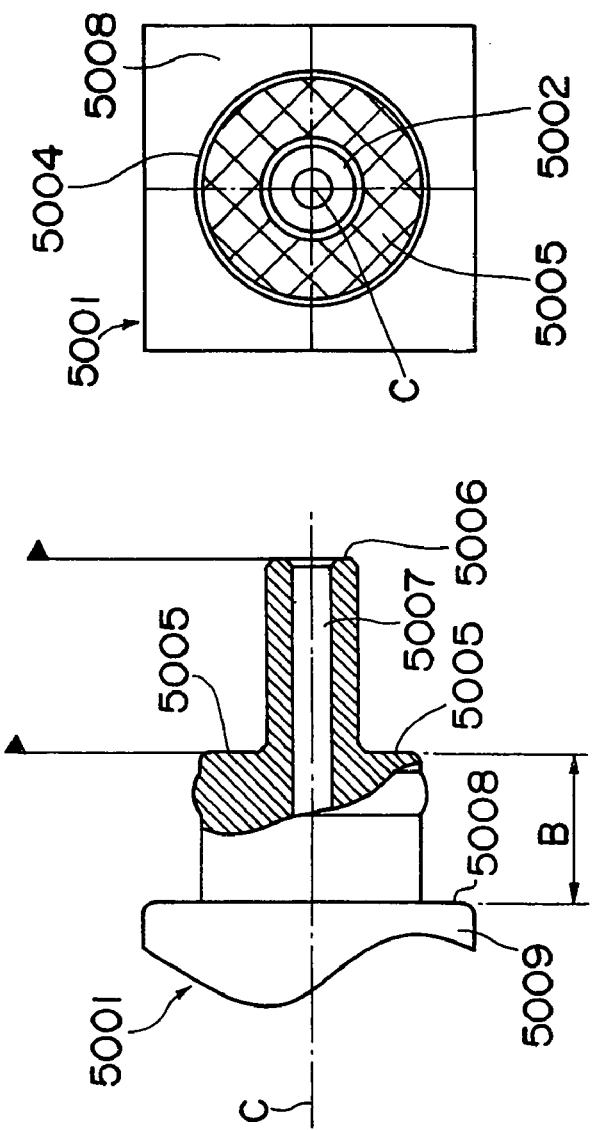
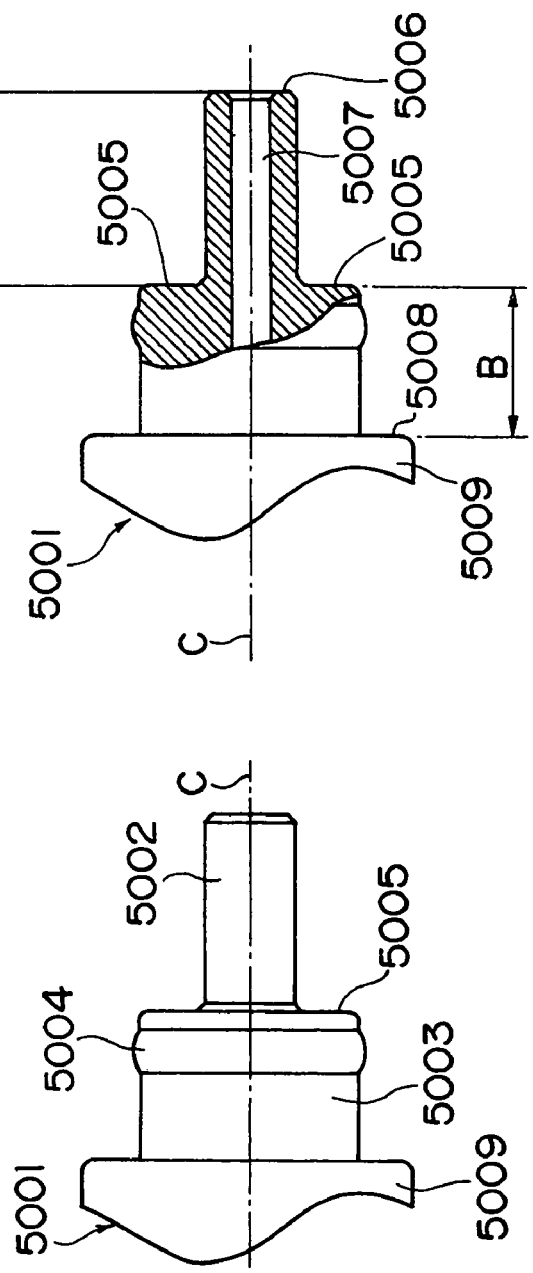
Fig.5A PRIOR ART
Fig.5B PRIOR ART
Fig.5C PRIOR ART

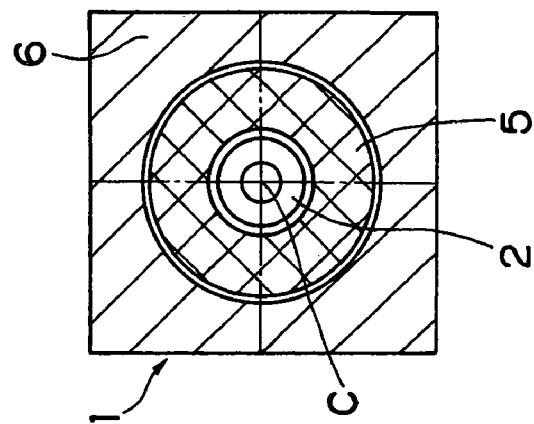
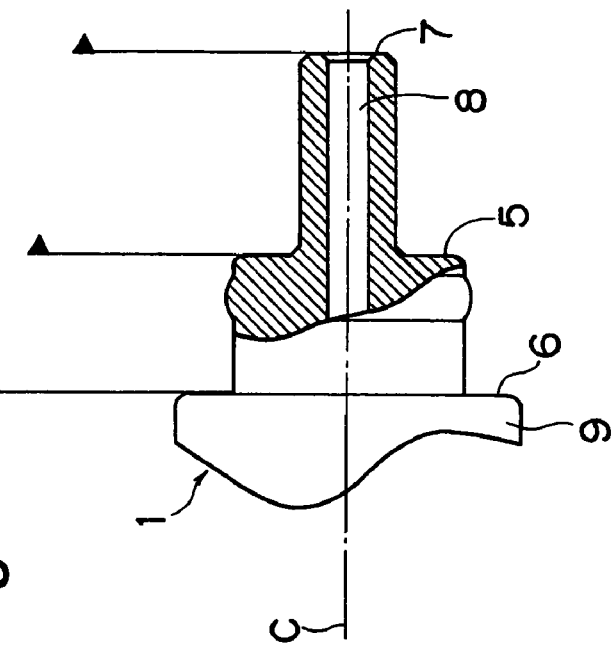
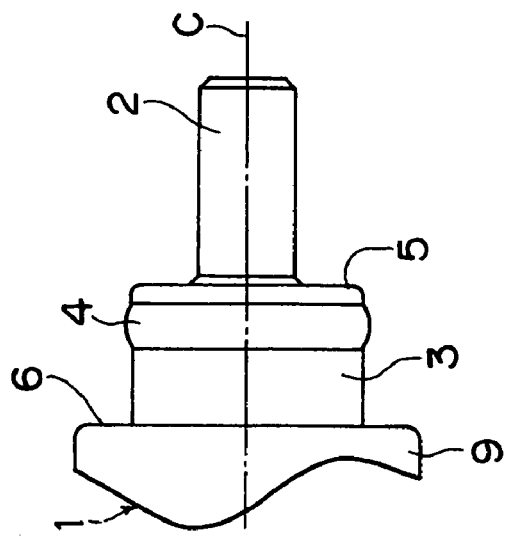

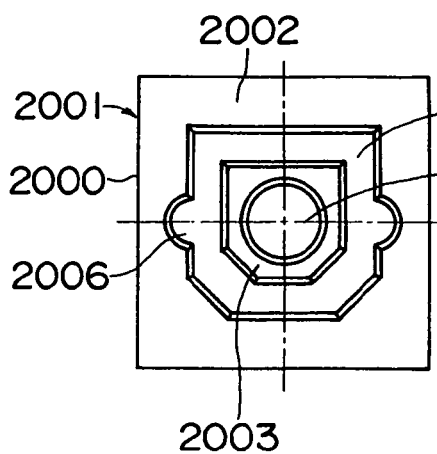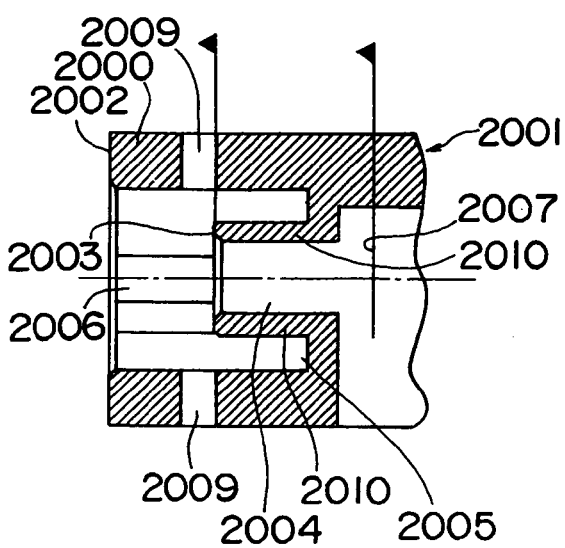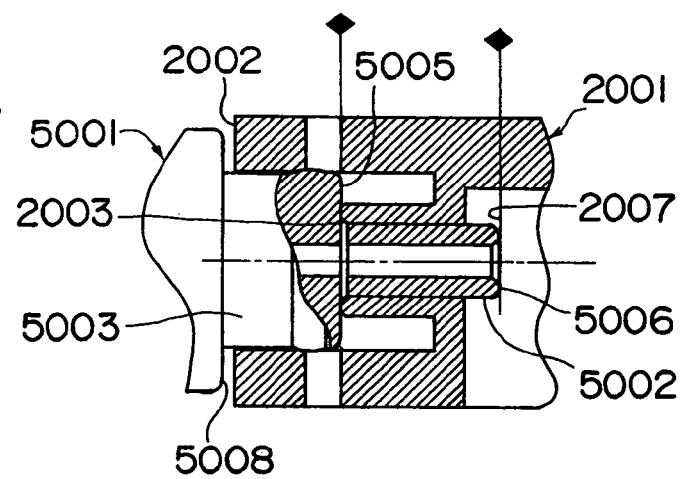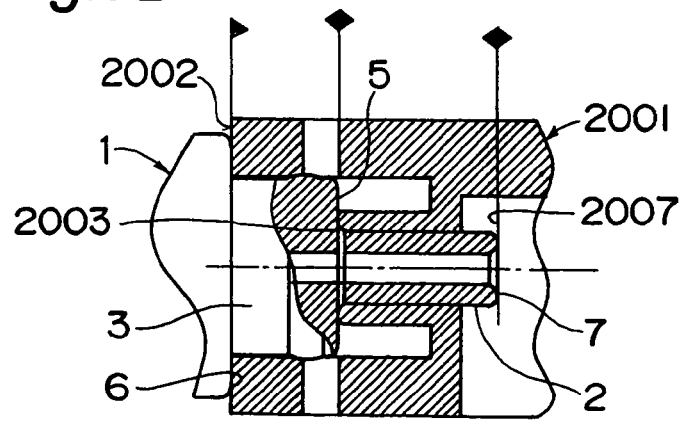

PLUG AND RECEPTACLE FOR OPTICAL CONNECTOR, OPTICAL CONNECTOR, AND ELECTRONIC EQUIPMENT

This nonprovisional application claims priority under 35 U.S.C. §119(a) on Patent Application No(s). 2003-272788 filed in Japan on Jul. 10, 2003, the entire contents of which are hereby incorporated by reference.

BACKGROUND OF THE INVENTION

1 Field of the Invention

The present invention relates to a plug and a receptacle for an optical connector that is used for optical transmission.

The invention also relates to an optical connector including such a plug and receptacle.

The invention also relates to electronic equipment having such an optical connector.

2 Description of Related Art

The term "electronic equipment" herein broadly encompasses information communication equipment such as digital TV (television) sets, digital BS (broadcasting satellite) tuners, CS (communication satellite) tuners, DVD (digital versatile disc) players, super audio CD (compact disc) players, AV (audio video) amplifiers, audio, personal computers, personal computer peripheral, portable telephones, and PDA (personal digital assistants); amusement equipment such as pachinko machines and other game equipment; and any other equipment using optical transmission.

A conventional example 1 of a plug and a receptacle of an optical connector is shown in FIGS. 1A through 1C and FIGS. 2A and 2B, which connector (referred to as a rectangular connector) is conforming to RC-5720B, a standard of JEITA (Japan Electronics and Information Technology Industries Association, formerly EIAJ: Electronic Industries Association of Japan). FIG. 1A is a side view of the plug, FIG. 1B is a sectional view of the same, and FIG. 1C is a front view of the same. FIG. 2A is a front view of the receptacle, and FIG. 2B is a sectional side elevation of the same. As shown in FIGS. 1A through 1C, the plug 1001 has a cylindrical plug tip section 1002, a rectangular plug peripheral section 1003, and a plug body 1009 to be held by a person at the time of insertion into the receptacle. On the plug peripheral section 1003 are provided guides 1004 for guiding the plug at the plug insertion and protrusions 1005 for engaging with the receptacle. As shown in FIG. 1B, an optical fiber cable is inserted into a hole 1006 provided at center in the sectional view, and a tip thereof is formed into an optical reference plane 1007 by hot plate processing or polish processing. The plug 1001 is provided with one mechanical reference plane (reference plane for a fit with the receptacle) 1008, and a distance between the optical reference plane 1007 and the mechanical reference plane 1008 is set at 5.4 mm. In FIG. 1C, cross-hatching is provided on the mechanical reference plane 1008 for easy understanding. The receptacle 2001 has an insertion hole 2005 to be associated with the plug peripheral section, an insertion hole 2004 to be associated with the plug tip section, grooves 2006 to be associated with the guides of the plug, a plug tip holding section 2010 for holding the plug tip section, an optical element insertion hole 2008, and holes 2009 to be associated with the protrusions for engaging of the plug, in a rectangular housing 2000. As shown in FIG. 2B, an optical reference plane 2007 is provided at a distance of 9.1 mm from an end surface 2002 of the receptacle 2001, and a mechanical reference plane 2003 is provided at a distance of 5.4 mm from the optical reference plane 2007. The mechanical reference plane 2003 is an end surface of the plug tip holding section 2010.

By the insertion of the plug 1001 into the receptacle 2001, in a structure of this conventional example 1, the mechanical reference plane 1008 provided in the plug 1001 is brought into contact with the mechanical reference plane 2003 provided in the receptacle 2001, so that further insertion is restricted. In a state in which the mechanical reference planes 1008 and 2003 are in contact with each other, the optical reference planes 1007 and 2007 coincide with each other. Thus optical transmission is performed satisfactorily.

A conventional example 2 of a receptacle is shown in FIGS. 3A and 3B (see JP 2002-48952 A, for example). FIG. 3A is a front view in a state with a shutter closed, and FIG. 3B is a front view in a state with a shutter opened. As shown in FIGS. 3A and 3B, the receptacle 3010a has a shutter 3011, a plug insertion hole 3012, and grooves 3017 associated with guides provided on a plug, in a housing 3000. Reference character 3010b denotes a front of the housing of the receptacle. In the receptacle 3010a of the conventional example 2, the plug 1001 of the conventional example 1 can be inserted and fitted into the plug insertion hole 3012. The shutter 3011 opens and closes inside the plug insertion hole 3012 with assistance of a hinge 3016, so that foreign matter can reliably be prevented from entering the plug insertion hole 3012. On a front of the shutter 3011 is provided a groove 3011a for guiding the plug tip section 1007 during the insertion of the plug 1001 of the conventional example 1. As shown in FIG. 3B, blocks 3012a according to a shape of the plug are provided on side surfaces inside the plug insertion hole 3012.

When the plug 1001 of the conventional example 1 is inserted into the plug insertion hole 3012 of the receptacle 3010a of this conventional example 2, an extremity 1011 of the plug peripheral section of the plug 1001 is brought into contact with the blocks 3012a provided in the receptacle 3010a, so that further insertion is restricted. In a state in which the extremity 1011 of the plug peripheral section of the plug 1001 is in contact with the blocks 3012a, optical reference planes of the plug and receptacle coincide with each other.

A conventional example 3 of a receptacle is shown in FIGS. 4A through 4C (see JP 2000-131564 A, for example). FIG. 4A is a front view of the receptacle, FIG. 4B is a side view of the same, and FIG. 4C is a sectional side view of the same. As shown in FIGS. 4A through 4C, the receptacle 4200 has a housing 4205 having an insertion hole 4220 into which a plug is inserted, a shutter 4210 that is mounted on an entrance of the insertion hole 4220 with a hinge structure (having a shaft 4240) and that is intended for generally closing the insertion hole 4220, an elastic body 4230 for biasing the shutter 4210 toward the entrance, and grooves 4221 to be associated with guides provided on the plug. An optical element 4290 is provided behind the insertion hole 4220. When the plug is inserted into the insertion hole 4220, the shutter 4210 is housed in space 4225 in the insertion hole 4220 and functions so as to hold a side surface of the plug.

In the receptacle 4200 of the conventional example 3, a mechanical reference plane is not provided, and it is therefore uncertain which part abuts on the plug when the plug is inserted into the insertion hole 4220.

A conventional example 4 of a plug is a round optical plug 5001 as shown in FIGS. 5A through 5C (e.g., Horizon Tec Co., Ltd., "DIY products, OPB-41, circular plug (for Φ 4.0 mm cord)," online, searched on Jul. 1, 2004, see URL: http://www.horizontec.biz/opb41.htm). FIG. 5A is a side view of the plug 5001, FIG. 5B is a sectional side view of the same, and FIG. 5C is a front view of the same. The plug 5001 has a cylindrical plug tip section 5002, a cylindrical plug peripheral section 5003, and a plug body 5009 to be held by a person on the occasion of insertion into a receptacle. Around the plug peripheral section 5003 is provided an annular protrusion 5004 for engaging with the receptacle. Numeral 5007 denotes a hole in which an optical fiber cable is positioned. The plug 5001, of which the plug peripheral section 5003 is cylindrical, can be inserted into the rectangular receptacle 2001 defined in JEITA RC-5720B at any angle about a center C thereof. Moreover, the plug can be turned after the insertion, and thus torsion of the cable can be canceled.

A positional relation between an optical reference plane 5006 and a mechanical reference plane 5005 in the plug 5001 of the conventional example 4 is the same as the positional relation between the optical reference plane 1007 and the mechanical reference plane 1008 in the rectangular plug 1001 of the conventional example 1.

As apparent from the above, there exist various types of plugs and receptacles, and those plugs and receptacles may be used in combination in various manners.

For example, insertion of the plug 5001 of the conventional example 4 into the receptacle 2001 of the conventional example 1 causes no problem because the optical reference plane 2007 of the receptacle 2001 and the optical reference plane 5006 of the plug 5001 coincide with each other.

When the plug 5001 of the conventional example 4 is inserted into the receptacle 3010a of the conventional example 2, however, the plug 5001 does not rest against the blocks 3012a provided in the receptacle 3010a because a part associated with the extremity 1011 of the plug peripheral section of the plug 1001 of the conventional example 1 is not provided in the plug 5001, but the end surface 3010b of the housing of the receptacle 3010a and an end surface 5008 of the plug body come into contact with each other, so that further insertion of the plug is restricted. In this situation, the optical reference plane 5006 of the plug 5001 is in a position deeper than the optical reference plane 2007 of the receptacle, and contact is therefore made between the plug tip 5006 and an optical element provided inside the receptacle. As a result, the optical element may fail, and flaws on the plug tip 5006 may cause transmission loss and deterioration in transmission quality.

When the plug 5001 of the conventional example 4 is inserted into the receptacle 4200 of the conventional example 3, as is the case with the conventional example 2, the optical element provided inside the receptacle may fail or damage to the plug tip 5006 may cause transmission loss and deterioration in transmission quality because a mechanical reference plane is not provided in the receptacle 4200 of the conventional example 3.

SUMMARY OF THE INVENTION

A feature of the present invention is to provide a plug of an optical connector that can be used in combination with a variety of receptacles without causing problems with insertion thereof into a receptacle.

Another feature of the invention is to provide a receptacle suitable for such a plug.

A further feature of the invention is to provide an optical connector having such a plug, and electronic equipment having such an optical connector.

In order to accomplish the above feature, there is provided, according to the present invention, a plug for an optical connector, which plug is to be combined with a receptacle having a plug insertion hole, the plug comprising:

a plug tip section defining an optical reference plane that is to coincide with an optical reference plane in the receptacle;

a first mechanical reference plane that is positioned a specified distance behind the optical reference plane of the plug tip section with respect to an insertion direction so as to be able to be brought into contact with an element within the receptacle; and a second mechanical reference plane that is positioned a specified distance behind the optical reference plane of the plug tip section with respect to the insertion direction so as to be able to be brought into contact with a front of the receptacle.

The plug of the present invention has the first mechanical reference plane and the second mechanical reference plane, and is therefore usable in combination with a variety of receptacles without causing problems with insertion thereof into a receptacle.

For a receptacle that is to be combined and that has therein an optical reference plane and an element (corresponding to a mechanical reference plane) positioned at a specified distance from the optical reference plane toward a front thereof, such as a rectangular receptacle defined in JEITA (Japan Electronics and Information Technology Industries Association) RC-5720B, insertion of the plug tip section into a plug insertion hole brings the first mechanical reference plane into contact with the element in the receptacle, so that further insertion is restricted. Provided that the distance between the optical reference plane the plug tip section forms and the first mechanical reference plane has been defined in advance in accordance with JEITA RC-5720B, the optical reference plane in the receptacle and the optical reference plane of the plug of the invention are allowed to coincide with each other, with the first mechanical reference plane in contact with the element. Thus optical transmission is performed satisfactorily and problems are prevented from occurring.

For a receptacle that is to be combined and that does not have an element which can be brought into contact with the first mechanical reference plane, insertion of the plug tip section into a plug insertion hole brings the second mechanical reference plane into contact with a front surface of the receptacle, so that further insertion of the plug is restricted. Provided that the distance between the optical reference plane the plug tip section forms and the second mechanical reference plane has appropriately been set in advance, the optical reference plane in the receptacle and the optical reference plane of the plug of the invention are allowed to coincide with each other, with the second mechanical reference plane in contact with the front of the receptacle. Thus optical transmission is performed satisfactorily and problems are prevented from occurring.

In accordance with the plug of the invention, the optical reference plane in the receptacle and the optical reference plane of the plug of the invention thus coincide with each other even if the plug is combined with a variety of receptacles. As a result, such problems as failure of an optical element provided inside the receptacle and deterioration in transmission quality that might be caused by damage to the plug tip section are prevented. Thus the plug of the invention can satisfactorily be used in combination with a variety of receptacles.

In one embodiment, the distance between the optical reference plane defined by the plug tip section and the first mechanical reference plane is set at 5.4 mm, and the distance between the optical reference plane defined by the plug tip section and the second mechanical reference plane is set at 9.1 mm.

In accordance with the plug of the embodiment in combination with a receptacle defined in JEITA RC-5720B, insertion of the plug tip section into a plug insertion hole brings the first mechanical reference plane into contact with an element in the receptacle, so that further insertion is restricted. In a state in which the first mechanical reference plane is in contact with the element, the optical reference plane in the receptacle and the optical reference plane of the plug of the invention coincide with each other. Thus optical transmission is performed satisfactorily and problems are prevented from occurring.

For a receptacle that is to be combined and that does not have an element which can be brought into contact with the first mechanical reference plane, insertion of the plug tip section into a plug insertion hole brings the second mechanical reference plane into contact with a front of the receptacle, so that further insertion is restricted. In a state in which the second mechanical reference plane is in contact with the front of the receptacle, the optical reference plane in the receptacle and the optical reference plane of the plug of the invention coincide with each other. Thus optical transmission is performed satisfactorily and problems are prevented from occurring.

In accordance with the plug of the embodiment, the optical reference plane in the receptacle and the optical reference plane of the plug of the invention thus coincide with each other even if the plug is combined with a variety of receptacles. As a result, such problems as failure of an optical element provided inside the receptacle and deterioration in transmission quality that might be caused by damage to the plug tip section are prevented. Thus the plug of the invention can satisfactorily be used in combination with a variety of receptacles.

In this embodiment, a distance between the first mechanical reference plane and the second mechanical reference plane is 3.7 mm.

In one embodiment, the plug tip section is cylindrical, and the plug has a cylindrical peripheral section coaxial with the plug tip section and having a diameter that allows the cylindrical peripheral section to be inscribed in a plug insertion hole of a rectangular receptacle defined in JEITA RC-5720B.

The plug of the embodiment can be inserted into the rectangular receptacle defined in JEITA RC-5720B, at any angle about a center thereof. Besides, the plug can be turned after the insertion, and thus torsion of a cable can be canceled.

In the plug, an end surface of the cylindrical peripheral section may form the first mechanical reference plane.

The plug may have a plug body larger than the cylindrical peripheral section in size with respect to a direction perpendicular to the insertion direction, and a front of the plug body with respect to the insertion direction may form the second mechanical reference plane.

A receptacle according to the invention is usable in combination with the plug of the invention and has a plug insertion hole. The receptacle has a rear surface that is in depths of the plug insertion hole with respect to an insertion direction tapers off rearwards.

With insertion of a plug into the receptacle of the invention for an optical connector, a tip section of the plug is guided by the rear surface of the plug insertion hole that is in the depths of the plug insertion hole with respect to the insertion direction. Thus the plug is smoothly inserted into the receptacle. As a result, the plug tip section is prevented from being damaged, and the problem of deterioration in transmission quality is prevented.

There is provided, according to another aspect of the invention, a receptacle that is usable in combination with the plug of the invention and that has a plug insertion hole, wherein:

the receptacle comprises, at an entrance of the plug insertion hole, a hinged shutter that is openable in contact with the plug tip section as the plug is inserted into the plug insertion hole;

the shutter has a groove in a front thereof, the groove extending in a direction perpendicular to a hinge pin of the shutter for guiding the plug tip section; and the groove has a tapered surface at an extremity thereof.

The receptacle of the invention has the shutter at the entrance of the plug insertion hole, and therefore foreign matter can reliably be prevented from entering the plug insertion hole in which the plug is not inserted.

When the plug tip section is inserted into the plug insertion hole, the plug tip section is guided by the groove and thus the hinged shutter is smoothly opened. Besides, the tapered surface provided at the extremity of the groove prevents the plug tip section from being caught in by the extremity of the groove. Thus the shutter is opened smoothly, and the plug tip section is prevented from being damaged. As a result, such a problem as deterioration in transmission quality that might be caused by damage to the plug tip section is prevented.

In the receptacle of one embodiment, an edge of the tapered surface has an arc-shaped pattern bulging out, so that the plug tip section is reliably prevented from being caught in the extremity of the groove. Thus the shutter is opened smoothly, and the plug tip section is prevented from being damaged. As a result, such a problem as deterioration in transmission quality that might be caused by damage to the plug tip section is prevented.

The present invention also provides an optical connector including a receptacle having a plug insertion hole, and a plug, wherein the plug comprises:

a plug tip section defining an optical reference plane that is to coincide with an optical reference plane in the receptacle;

a first mechanical reference plane that is positioned a specified distance behind the optical reference plane of the plug tip section with respect to an insertion direction so as to be able to be brought into contact with an element within the receptacle; and a second mechanical reference plane that is positioned a specified distance behind the optical reference plane of the plug tip section with respect to the insertion direction so as to be able to be brought into contact with a front of the receptacle.

Due to the effects of the plug of the invention, which have been described above, the optical connector of the invention is prevented from suffering from such problems as failure of an optical element provided inside the receptacle and deterioration in transmission quality that might be caused by damage to the plug tip section. Thus reliability of optical transmission can be increased.

In the optical connector of the invention, the receptacle may have the structure as described above.

According to the present invention, there is also provided electronic equipment that includes the optical connector of the invention.

The electronic equipment is therefore prevented from suffering from such problems as failure of an optical element provided inside the receptacle of the optical connector and deterioration in transmission quality that might be caused by damage to the plug tip section. Thus reliability is increased.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIGS. 3A and 3B are views of a receptacle as a conventional example 2 that is provided with a shutter, wherein FIG. 3A is a front view of the receptacle with the shutter closed, and FIG. 3B is a front view of the receptacle with the shutter opened;

FIGS. 5A, 5B, and 5C are a side view, a sectional side view, and a front view, respectively, of a plug as a conventional example 4;

FIGS. 6A, 6B, and 6C are a side view, a sectional side view, and a front view, respectively, of a plug in accordance with one embodiment of the invention;

FIGS. 7A and 7B are a front view and a sectional side view, respectively, of the receptacle as the conventional example 1, FIG. 7C is a sectional side view in a case that the plug of the conventional example 4 has been inserted into the receptacle, and FIG. 7D is a sectional side view in a case that the plug shown in FIGS. 6A through 6C has been inserted into the receptacle;

DETAILED DESCRIPTION

Figure 1C:
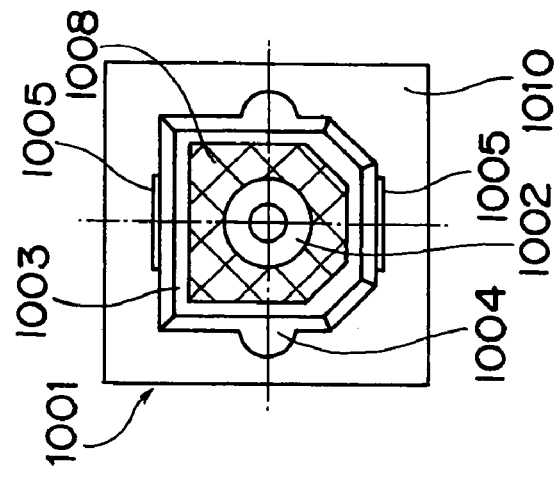
FIGS. 1A, 1B, and 1C are a side view, a sectional side view, and a front view, respectively, of a plug as a conventional example 1 that is defined in JEITA RC-5720B.

Hereinbelow, the present invention will be described in detail with reference to embodiments shown in the accompanying drawings.

First Embodiment

FIGS. 6A through 6C show a configuration of a plug 1 as one embodiment. FIG. 6A is a side view, FIG. 6B is a sectional side view, and FIG. 6C is a front view. As shown in FIG. 6A, the plug 1 has a cylindrical plug tip section 2, a cylindrical plug peripheral section 3 having the same axis as and a larger diameter than the plug tip section 2, and a rectangular plug body 9 to be held by a person on the occasion of insertion thereof into a receptacle. The diameter of the plug peripheral section 3 is set at a size such that the section is inscribed in a plug insertion hole 2005 (see FIGS. 7A and 7B) of a rectangular receptacle defined in JEITA RC-5720B. On the plug peripheral section 3, an annular protrusion 4 for engaging with the receptacle is provided along a circumference of the section 3. As shown in FIG. 6C, outside dimensions of the plug body 9 are set so as to be larger than those of the plug peripheral section 3.

An optical fiber cable (not shown) is inserted into a plug center hole 8 shown in FIG. 6B, and a tip thereof is finished by hot plate processing or polish processing. The tip of the optical fiber, that is, an end surface of the plug tip section 2 forms an optical reference plane 7.

An end surface 5 of the plug peripheral section 3 forms a first mechanical reference plane. A distance between the optical reference plane 7 the plug tip section 2 forms and the first mechanical reference plane 5 is set at 5.4 mm.

An end surface 6 of the plug body 9 forms a second mechanical reference plane. A distance between the optical reference plane 7 the plug tip section 2 forms and the second mechanical reference plane 6 is set at 9.1 mm.

As a result, a distance between the first mechanical reference plane 5 and the second mechanical reference plane 6 is 3.7 mm.

Figure 1B:
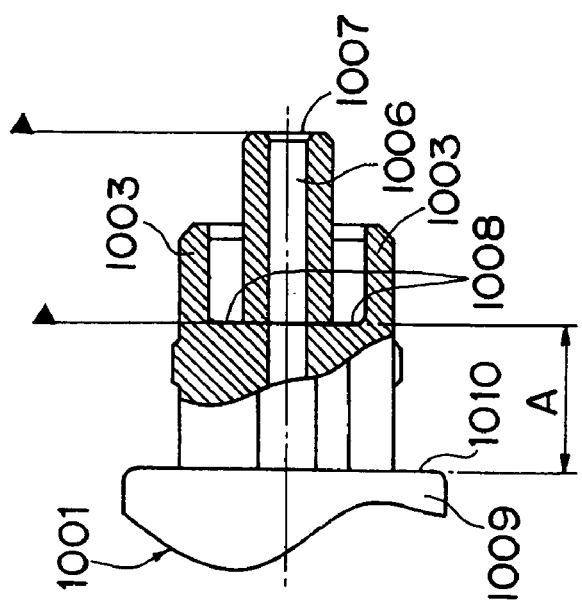
Figure 1A:
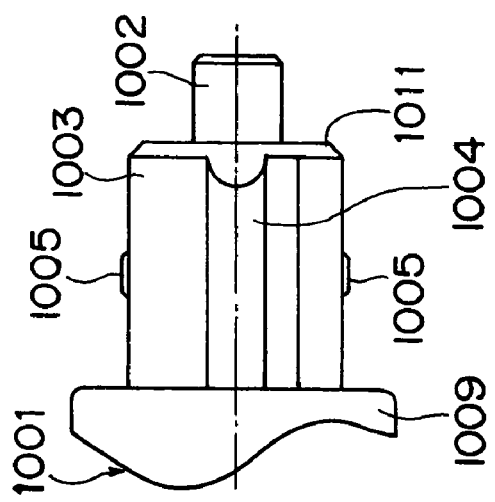
Figure 2A:
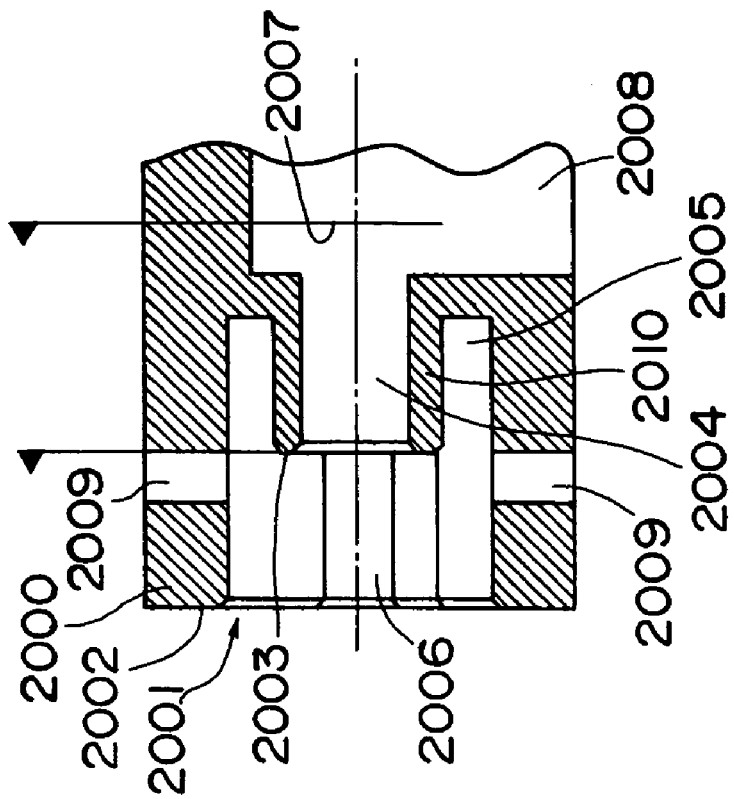
FIGS. 2A and 2B are a front view and a sectional side view, respectively, of a receptacle as the conventional example 1 that is defined in JEITA RC-5720B.
Figure 2B:
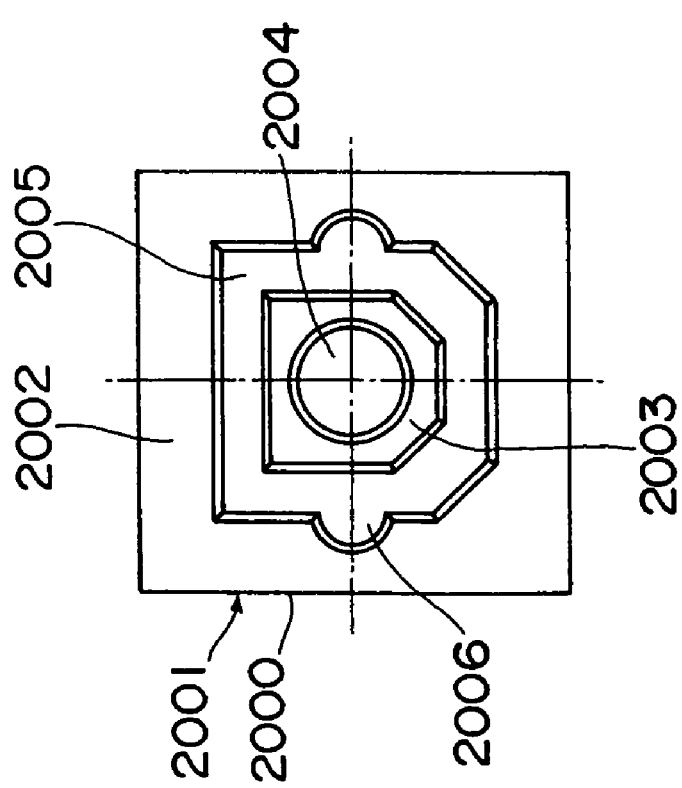
Figure 4C:
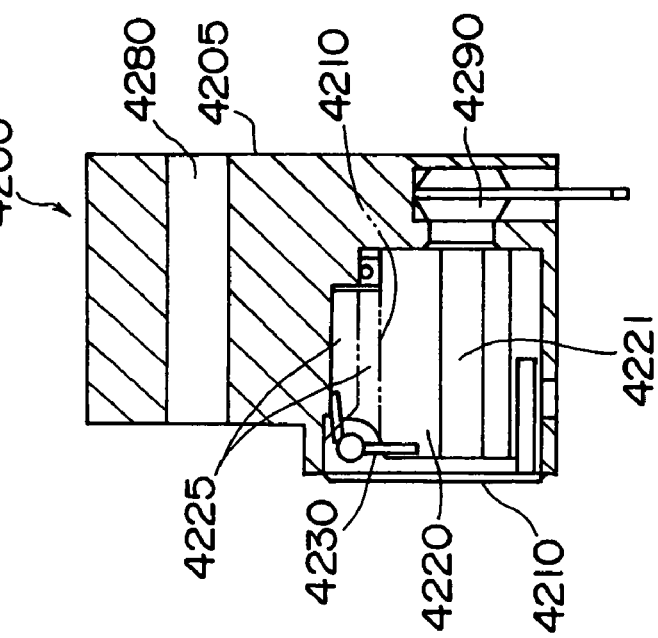
FIGS. 4A, 4B, and 4C are a front view, a side view, and a sectional side view, respectively, of a receptacle as a conventional example 3 that is provided with a shutter.
Figure 4B:
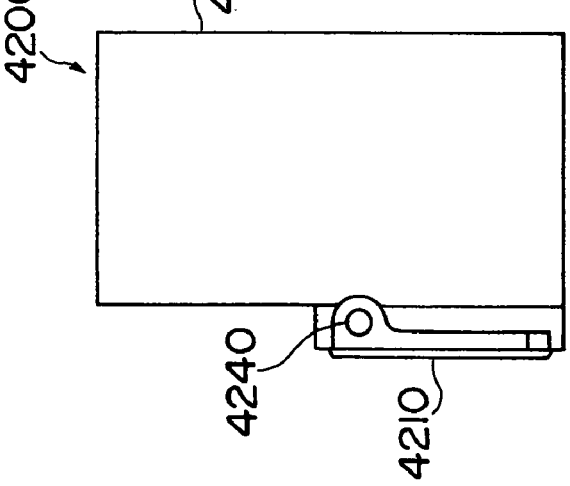
Figure 4A:
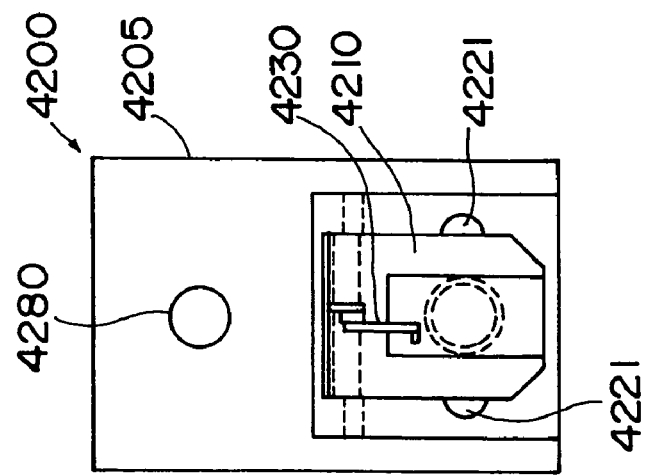

The distance between the optical reference plane 7 and the first mechanical reference plane 5 is equal to the distance between the optical reference plane 1007 and the mechanical reference plane 1008 in the rectangular plug 1001 of the conventional example 1 shown in FIGS. 1A through 1C. The distance is also equal to the distance between the optical reference plane 5006 and the mechanical reference plane 5005 in the plug 5001 of the conventional example 4 shown in FIGS. 5A through 5C.

In the rectangular plug 1001 of the conventional example 1, a distance A between the mechanical reference plane 1008 and an end surface 1010 of the plug body 1009 is specified at 4.1 mm, and a distance between the optical reference plane 1007 and the plug body end surface 1010 therefore runs into 9.5 mm.

In the round plug 5001 of the conventional example 4, a distance B between the mechanical reference plane 5005 and the end surface 5008 of the plug body 5009 is 4.1 mm as is the case with the conventional example 1, and a distance between the optical reference plane 5006 and the plug body end surface 5008 therefore runs into 9.5 mm.

By contrast, the plug 1 of the embodiment is significantly different from the plugs of the conventional examples 1 and 4 in that the distance between the optical reference plane 7 and the second mechanical reference plane 6 is set at 9.1 mm.

Hereinbelow, a case in which the plug 1 of the embodiment is inserted into the rectangular receptacle of the conventional example 1 defined in JEITA RC-5720B will be described in comparison with a case in which the round plug 5001 of the conventional example 4 is inserted into the same receptacle.

FIG. 7A is a front view of the rectangular receptacle 2001 defined in JEITA RC-5720B, and FIG. 7B is a sectional side view of the receptacle 2001. In the rectangular receptacle 2001, a distance between the optical reference plane 2007 and the mechanical reference plane 2003 is set at 5.4 mm.

In the case that the round optical plug 5001 of the conventional example 4 is inserted into the rectangular receptacle 2001, as shown in FIG. 7C, the plug tip section 5002 is inserted into depths (rightward in FIG. 7C) along the plug tip insertion hole 2004 in the plug tip holding section 2010 of the receptacle 2001. In course of time, the mechanical reference plane 5005 of the plug is brought into contact with the mechanical reference plane 2003 in the receptacle 2001 and is then stopped. In this state, the optical reference plane 5006 of the optical plug and the optical reference plane 2007 of the receptacle coincide with each other. Thus, contact is prevented between the optical element (not shown) provided inside the receptacle and the plug tip 5006. Between the plug body end surface 5008 and the front surface 2002 of the receptacle, there is no contact, but a clearance of 0.4 mm. This positional relationship is the same as that in the conventional example 1 defined in JEITA RC-5720B in which the rectangular optical plug 1001 has been fitted in the rectangular receptacle 2001.

In the case that the round optical plug 1 of the embodiment is inserted into the rectangular receptacle 2001, as shown in FIG. 7D, the plug tip section 2 is inserted into depths (rightward in FIG. 7D) along the plug tip insertion hole 2004 in the plug tip holding section 2010 of the receptacle 2001, as is the case with FIG. 7C. In course of time, the mechanical reference plane 5 of the plug is brought into contact with the mechanical reference plane 2003 in the receptacle 2001 and is then stopped. At this point, the second mechanical reference plane 6 of the optical plug is in contact with the front surface 2002 of the receptacle. In this state, the optical reference plane 7 of the optical plug and the optical reference plane 2007 of the receptacle coincide with each other. Thus, contact is prevented from occurrence between the optical element (not shown) provided inside the receptacle and the plug tip 5006. In the case that the plug 1 of the embodiment has been inserted into the rectangular receptacle 2001, therefore, optical signal can be transmitted without deterioration in transmission quality, as is the case with the plug 5001 of the conventional example 4 and the rectangular plug 1001 of the conventional example 1 inserted into the receptacle 2001.

Hereinbelow, a case in which the plug 1 of the embodiment is inserted into a receptacle having a shutter in a plug insertion hole as in the conventional examples 2 and 3 will be described in comparison with a case in which the round plug 5001 of the conventional example 4 is inserted into the same receptacle.

Figure 8A:
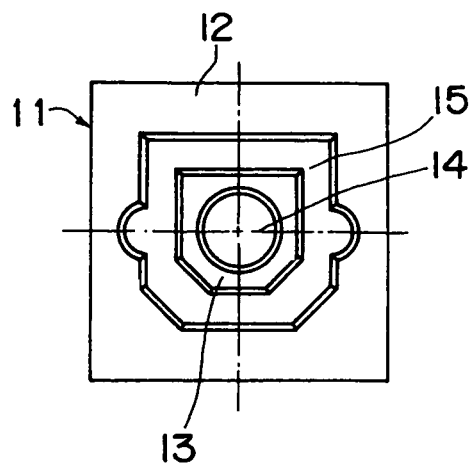
FIGS. 8A and 8B are a front view and a sectional side view, respectively, of a receptacle in accordance with one embodiment of the invention.
Figure 8B:
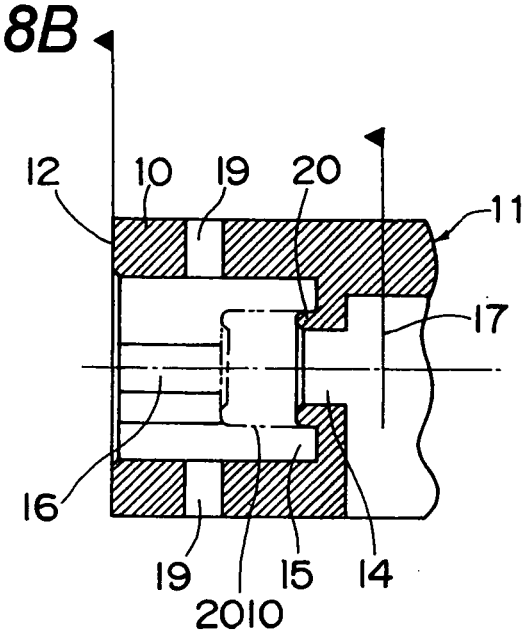

FIG. 8A is a front view of a subject receptacle 11 with a shutter opened, and FIG. 8B is a sectional side view of the same. The receptacle 11 has an insertion hole 15 corresponding to the plug peripheral section, an insertion hole 14 corresponding to the plug tip section, grooves 16 corresponding to the guides of the plug, a plug tip holding section 20 for holding the plug tip section, and a hole 19 corresponding to the engaging protrusion of the plug, in a rectangular housing 10.

As apparent from the front view (the state with the shutter opened) of FIG. 8A, shapes of the plug insertion holes 14 and 15 of the receptacle 11 are identical to those of the plug insertion holes 2004 and 2005 of the receptacle 2001 of the conventional example 1. Accordingly, any of the rectangular optical plug 1001 of the conventional example 1, the round optical plug 5001 of the conventional example 4, and the optical plug 1 of the embodiment can be inserted into the receptacle 11.

The receptacle 11 employs a structure in which the shutter (not shown) is provided in a hinged manner in vicinity of a front surface 12 of the receptacle so that the shutter pivots around a hinge axis and thereby opens toward inside of the plug insertion hole 15. As shown in FIG. 8B, therefore, a size of the plug tip holding section 20 in a direction of the insertion is set smaller than that of the plug tip holding section 2010 of the rectangular receptacle 2001 of the conventional example 1 so that the section 20 may not hinder the shutter from pivoting. In FIG. 8B, for comparison, an outline of the tip holding section 2010 in the receptacle of the conventional example 1 is shown by a dotted line.

In the receptacle 11, a distance between an optical reference plane 17 on which an optical element (not shown) is provided and the front surface 12 of the receptacle is set at 9.1 mm.

Figure 8C:
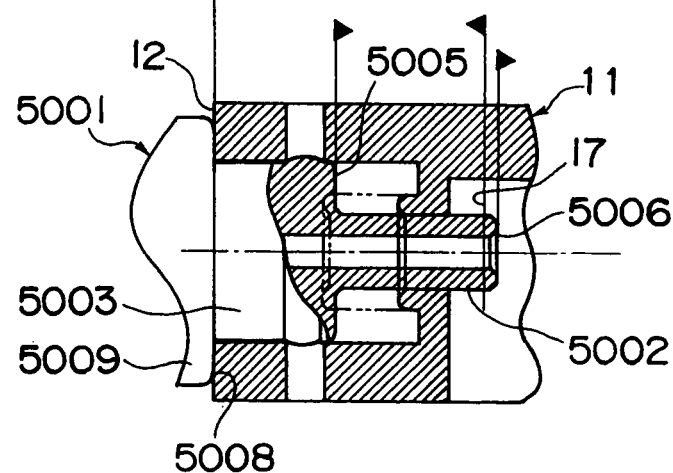
FIG. 8C is a sectional side view in a case that the plug of the conventional example 4 has been inserted into the receptacle.

In the case that the optical plug 5001 of the conventional example 4 is inserted into the receptacle 11, as shown in FIG. 8C, the plug tip section 5002 is inserted into depths (rightward in FIG. 8C) along the plug tip insertion hole 14 in the plug tip holding section 20 of the receptacle 11. The mechanical reference plane 5005 provided in the optical plug goes beyond a position corresponding to the mechanical reference plane provided in the receptacle of the conventional example 1 because the size of the plug tip holding section 20 in the direction of the insertion is small. In course of time, the plug body end surface 5008 is brought into contact with the front surface 12 of the receptacle and is then stopped. In this state, the optical reference plane 5006 of the optical plug and the optical reference plane 17 of the receptacle do not coincide with each other. That is, the optical reference plane 5006 of the plug resides in a position deeper than (on the right side in FIG. 8C) the optical reference plane 17 of the receptacle, and there is a gap between both the planes. This is a result of the insertion of the plug 5001 deeper by the clearance of 0.4 mm between the plug body end surface 5008 and the front surface 2002 of the receptacle which clearance is shown in FIG. 7C. This means that the tip 5006 of the optical plug may come into contact with the optical element (not shown) in the receptacle 11.

That is because the size of the plug tip holding section 20 in the direction of the insertion is decreased for purpose of providing a structure which does not hinder the pivoting movement of the shutter, as already described, and because the decrease of the size of the plug tip holding section 20 eliminates a mechanical reference plane corresponding to the mechanical reference plane 5005 provided in the optical plug 5001 of the conventional example 4.

In the case that the optical plug 1001 described as the conventional example 1 is inserted into the receptacle 11, the optical reference planes of both can be made to coincide with each other by provision of blocks to the receptacle 11 in a position in which the extremity 1011 of the plug peripheral section of the optical plug 1001 is to come into contact with the blocks, as in the receptacle of the conventional example 2.

Figure 8D:
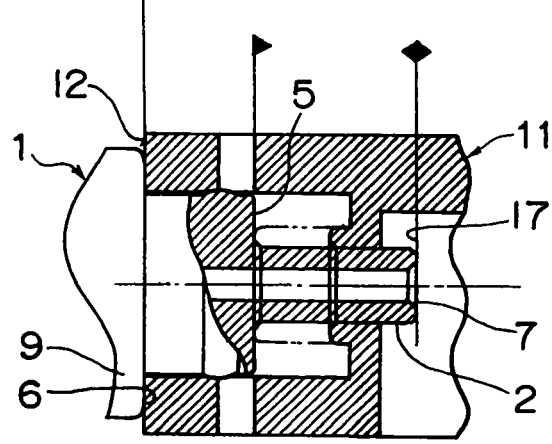
FIG. 8D is a sectional side view in a case that the plug shown in FIGS. 6A through 6C has been inserted into the receptacle.

In the case that the optical plug 1 of the embodiment is inserted into the receptacle 11, as shown in FIG. 8D, the plug tip section 2 is inserted into depths (rightward in FIG. 8D) along the plug tip insertion hole 14 in the plug tip holding section 20 of the receptacle 11. In course of time, the second mechanical reference plane 6 provided in the optical plug is brought into contact with the front surface 12 of the receptacle and is then stopped. Then the first mechanical reference plane 5 provided in the optical plug is not in contact with any elements (parts) in the receptacle 11. In this state, the optical reference plane 7 of the optical plug and the optical reference plane 17 of the receptacle coincide with each other. Thus no contact is made between the optical element (not shown) provided inside the receptacle and the plug tip 7.

By the combination of the plug 1 of the embodiment and the receptacle 11, therefore, optical signal can be transmitted without deterioration in transmission quality, as is the case with the combination of the rectangular plug 1001 and the rectangular receptacle 2001 described as the conventional example 1.

The plug 1, of which the plug peripheral section 3 is cylindrical, can be inserted into the rectangular receptacle 2001 conforming to JEITA RC-5720B, at any angle about a center C thereof. Moreover, the plug can be turned after the insertion, and thus torsion of a cable can be canceled.

In the embodiment, setting of the first and second mechanical reference planes is done on the basis of the rectangular plug and receptacle (F05 type) defined in JEITA RC-5720B. The setting of the first and second mechanical reference planes, however, may be done for an optical plug corresponding to connectors of two-core F07 type, two-core PN type, SC type, FC type and the like and other special connectors. Furthermore, a larger number of mechanical reference planes may be set.

Second Embodiment

Figure 9A:
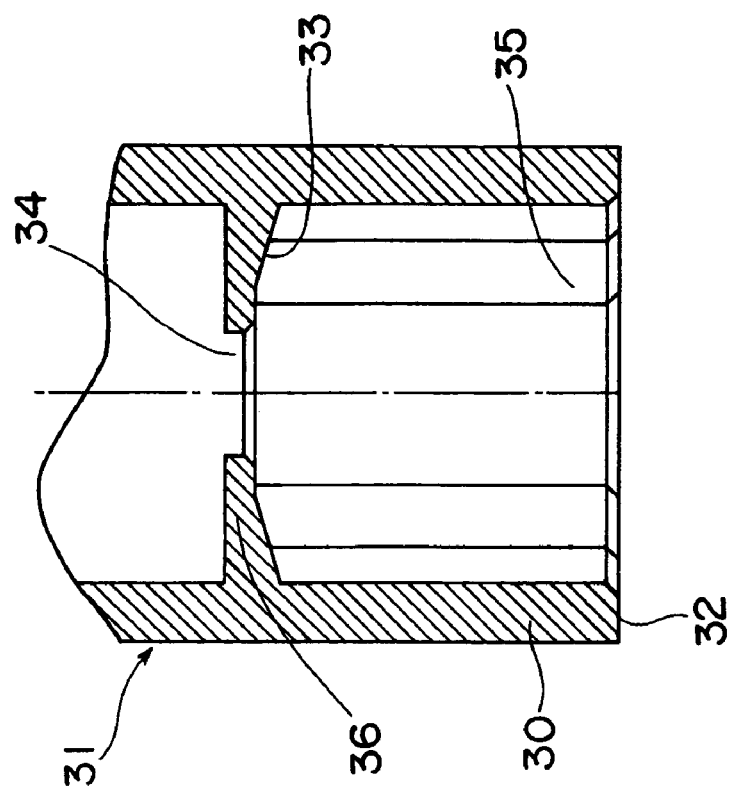
FIG. 9A is a sectional top view of the receptacle of the conventional example 2.
Figure 9B:
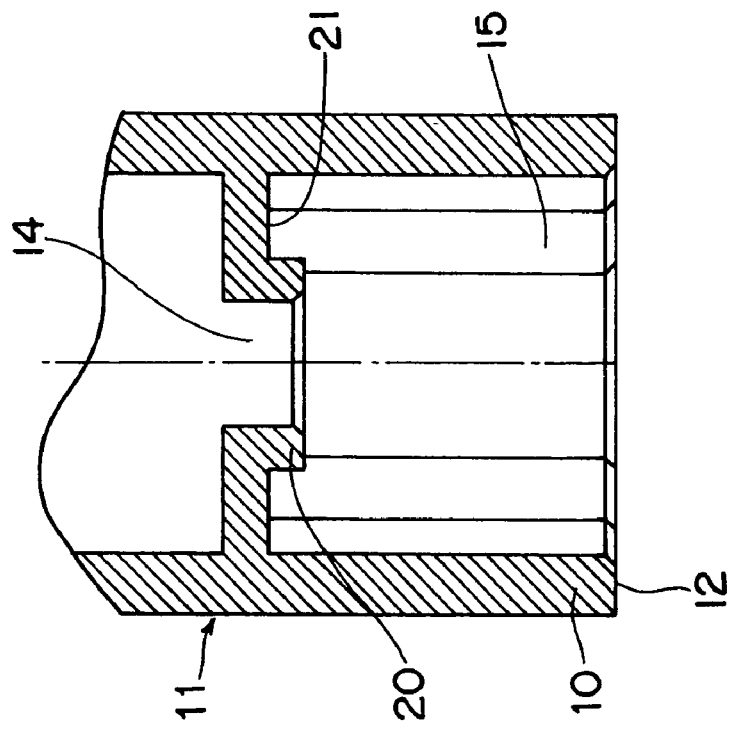
FIG. 9B is a sectional top view of a receptacle in accordance with one embodiment of the invention.

FIG. 9B shows a section, as seen from above, of a receptacle 31 in accordance with an embodiment. For comparison, FIG. 9A shows a section, as seen from above, of the receptacle 11 shown in FIGS. 8A and 8B and described above.

The receptacle 31 shown in FIG. 9B has an insertion hole 35 corresponding to a plug peripheral section, an insertion hole 34 corresponding to a plug tip section, and a plug tip holding section 36 for holding the plug tip section, in a rectangular housing 30. The receptacle 31 is different from the receptacle 11 in that the receptacle 31 has a tapered bottom surface 33 (on upper side in FIG. 9B) of the plug insertion hole 35, the bottom surface opening conically toward the front, so that the plug tip section can easily be guided toward the plug tip insertion hole 34.

In the receptacle 11 in FIG. 9A, a bottom surface 21 of the plug insertion hole 15 is perpendicular to the direction of the insertion, and there is a step (a plug tip holding section) 20 between the surface 21 and the plug tip insertion hole 14. In the other points, the receptacle 31 of FIG. 9B and the receptacle 11 of FIG. 9A are configured similarly.

The plug 5001 of the conventional example 4 and the optical plug 1 of the embodiment shown in FIGS. 6A through 6C have the cylindrical plug peripheral sections 5003, 3, and therefore sizes thereof in a direction perpendicular to the direction of the insertion are comparatively small. When the plug 5001, 1 is inserted into the receptacle 11, it is difficult to insert the plug horizontally or vertically and the plug may diagonally be inserted because a size of the plug tip holding section 20 of the receptacle 11 in the direction of the insertion is small. With use of the receptacle 11 of FIG. 9A, in this case, the plug tip section 5002, 2 may collide with the bottom surface 21 of the plug insertion hole 15 without being properly inserted into the plug tip holding section 20 of the receptacle. In that event, because the step (the plug tip holding section) 20 exists between the surface 21 and the plug tip insertion hole 14, the plug must be removed temporarily from the receptacle and reinserted therein, which takes a lot of trouble. In addition, the plug tip section 5002, 2 may be damaged and thus deterioration in transmission quality may be caused.

In the receptacle 31 of FIG. 9B, by contrast, the bottom surface 33 of the plug insertion hole 35 is tapered so as to be conically widened forward, or to be narrowed backward, and there is no stepped portion. In the event that the plug is inserted diagonally, therefore, the plug tip section 5002, 2 is easily guided and smoothly inserted into the plug insertion hole 34. Besides, a structure preventing damages to the plug tip section can be provided by mirror grinding on the bottom surface of the plug insertion hole 35, use of a slippery material, or the like.

Though the bottom surface 33 of the plug insertion hole 35 in the embodiment has the tapered shape so as to open conically forward, a shape of the surface is not limited thereto. The surface may be tapered with uncurved or flat slopes, an elliptic shape or the like.

Third Embodiment

Figure 10A:
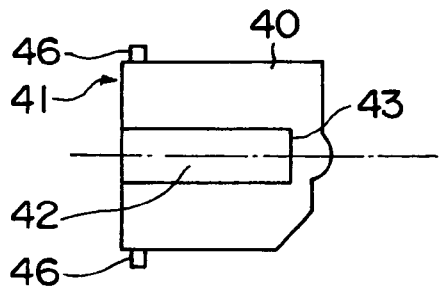
FIG. 10A is a front view of a shutter that is the same as the shutter in the conventional example 2.
Figure 11A:
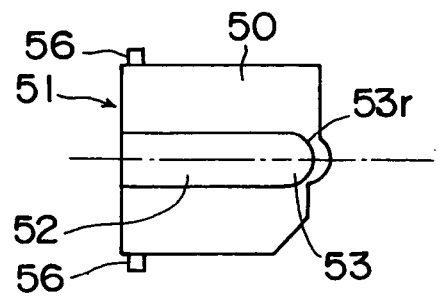
FIG. 11A is a front view of a shutter of the receptacle in accordance with the embodiment of the invention.
Figure 10B:
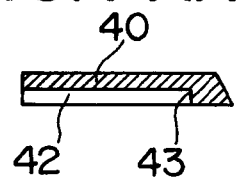
FIG. 10B is a section of the shutter.
Figure 11B:
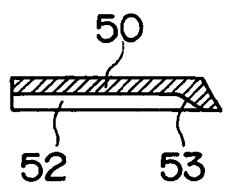
FIG. 11B is a section of the shutter.

FIG. 11A shows a front view of a shutter 51 that is suitable for the receptacle 31, and FIG. 11B shows a section of the shutter 51 as seen looking from above. For comparison, FIG. 10A shows a front view of a shutter 41 that is the same as the shutter 3011 in the conventional example 2 shown in FIGS. 3A and 3B, and FIG. 10B shows a section of the shutter 41 as seen from above.

The shutter 51 shown in FIG. 11A has a shutter body 50 generally shaped like a flat plate, and hinge pins 56, 56 protruding upward and downward, as viewed in the figure, along one side (a left side in FIG. 11A) of the shutter body 50. The front of the shutter body 50 is formed with a groove 52 that extends in a direction perpendicular to the hinge pins 56, 56 (lateral direction in this example) for guiding the plug tip section. As shown in FIG. 11B, a tapered surface 53 sloped linearly is formed at a right end (i.e., a deeper end or extremity in a state in which the shutter is opened) of the groove 52. As shown in FIG. 11A, an edge 53r of the tapered surface 53 has a semicircular pattern bulging out.

As is the case with the shutter 51, the shutter 41 shown in FIG. 10A has a shutter body 40 generally shaped like a flat plate, hinge pins 46, 46, and a groove 42. An extremity 43 of the groove 42, however, is defined by a surface 43 perpendicular to the shutter body 40, as shown in FIG. 10B, and an edge of the surface 43 has a pattern perpendicular to a longitudinal direction of the groove 42, as shown in FIG. 10A.

Figure 10C:
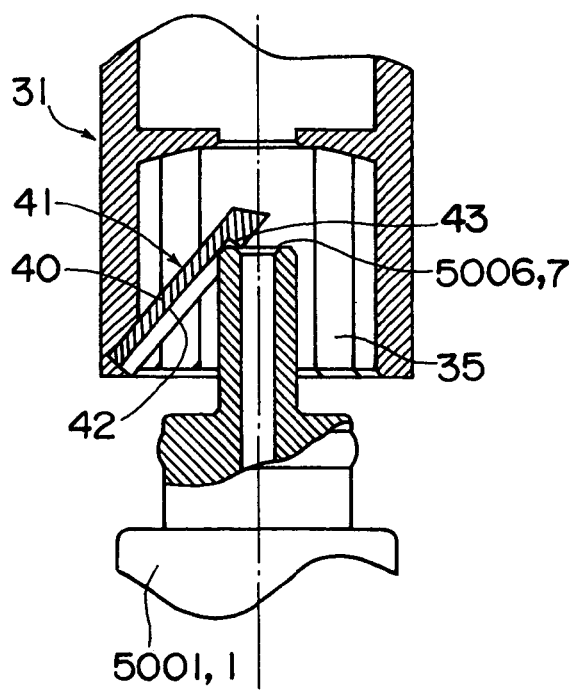
FIG. 10C is a diagram showing a situation in which an optical plug is being inserted into the receptacle having the shutter.

FIG. 10C shows a situation in which the optical plug 5001 of the conventional example 4 or the optical plug 1 of the embodiment shown in FIGS. 6A–6C is being inserted into the receptacle 31 having the shutter 41 shown in FIG. 10A. As shown in FIG. 10C, the tip 5006, 7 of the optical plug 5001, 1 being inserted is guided along the groove 42 formed in the front surface of the shutter body 40 while pushing the shutter 41. The shutter 41 is opened while pivoting on the hinge pins 46, 46. When the optical plug 5001, 1 is further inserted, the plug tip 5006, 7 may be caught in the end surface 43 and thus may be damaged because the right end surface 43 of the groove 42 is perpendicular to the shutter body 40. This might cause deterioration in transmission quality.

Figure 11C:
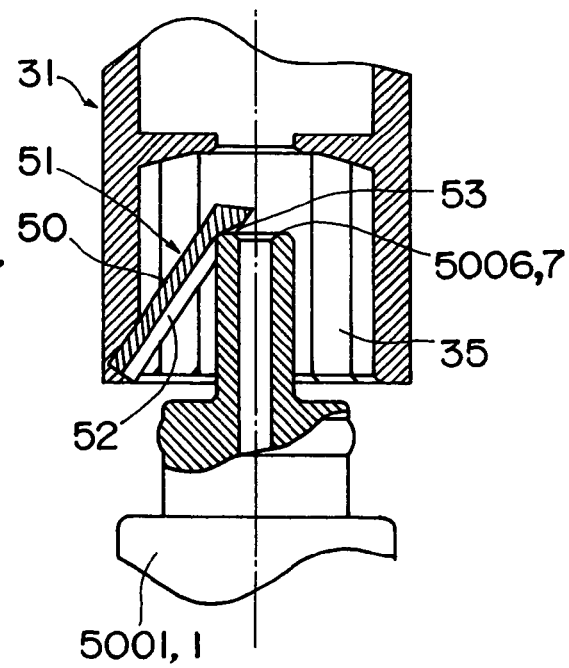
FIG. 11C is a diagram showing a situation in which an optical plug is being inserted into the receptacle having the shutter.

FIG. 11C shows a situation in which the optical plug 5001 of the conventional example 4 or the optical plug 1 of the embodiment shown in FIGS. 6A through 6C is being inserted into the receptacle 31 having the shutter 51 shown in FIG. 11A. As shown in FIG. 11C, the tip 5006, 7 of the optical plug 5001, 1 being inserted is guided along the groove 52 formed in the front surface of the shutter body 50 while pushing the shutter 51. The shutter 51 is opened while pivoting on the hinge pins 56, 56. Then, because the right end of the groove 52 forms the tapered surface 53 sloped relative to the shutter body 50 and because the border or edge of the tapered surface 53 has the arc-shaped pattern bulging out, the plug tip 5006, 7 is prevented from being caught in the extremity of the groove 52. Accordingly, the shutter 51 is smoothly opened and the plug tip 5006, 7 is prevented from being damaged. As a result, such a problem as deterioration in transmission quality that might be caused by damage to the plug tip section is prevented.

Though the tapered surface 53 at the extremity of the groove 52 of the shutter 51 is sloped linearly in the described embodiment, the shape of the surface is not limited thereto. The surface may be tapered in shape of a curve, an ellipse or the like.

Fourth Embodiment

Figure 12:
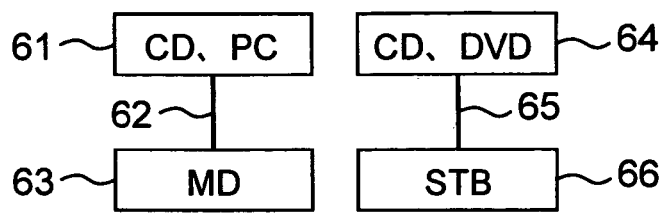
FIG. 12 is a diagram showing an example in which an optical connector with a combination of the plug and the receptacle of the invention is applied to optical transmission between AV equipment.
Figure 13:
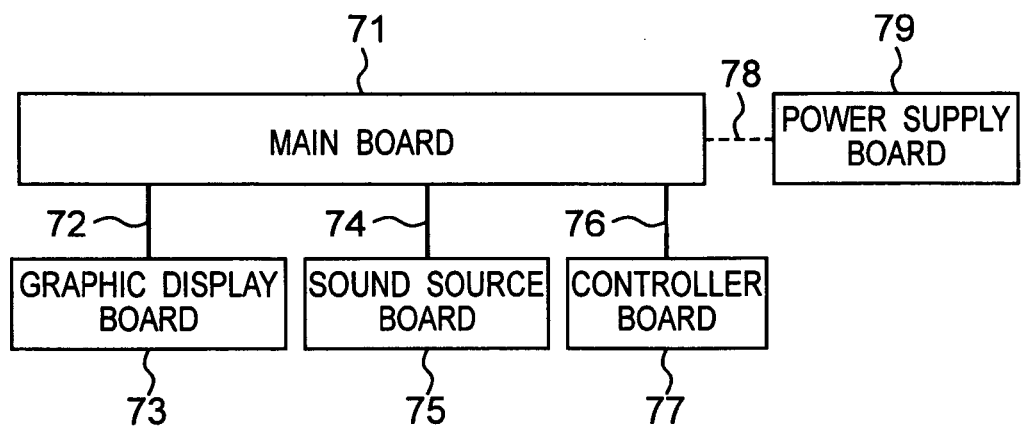
FIG. 13 is a diagram showing an example in which the optical connector with a combination of the plug and the receptacle of the invention is applied to optical transmission in game equipment.
Figure 14:
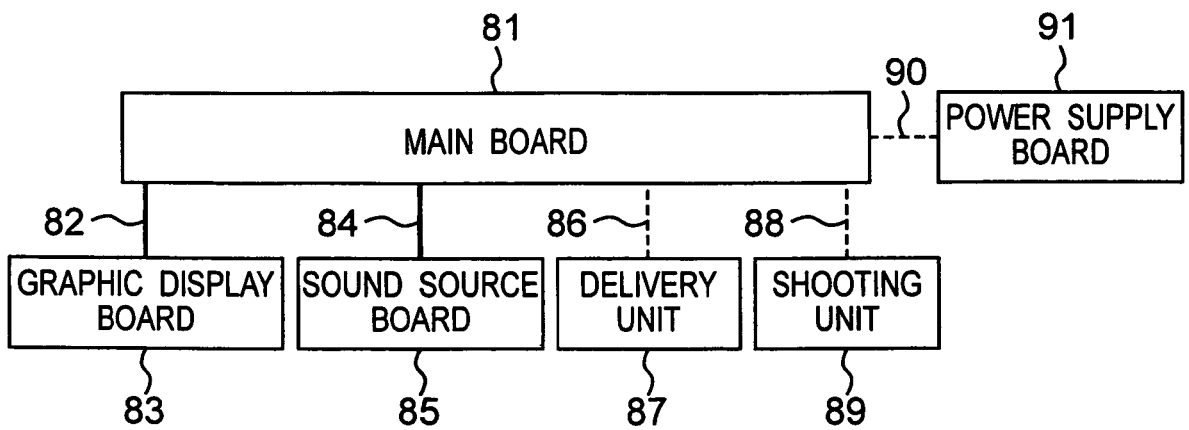
FIG. 14 is a diagram showing an example in which the optical connector with a combination of the plug and the receptacle of the invention is applied to optical transmission inside a pachinko machine.

FIGS. 12, 13, and 14 show examples in which an optical connector with a combination of the plug and the receptacle of the invention as described above is applied to optical transmission between various electronic equipment.

FIG. 12 shows an example of the application to optical transmission between AV equipment. In this example, a CD (compact disc) player and a PC (personal computer) 61 are connected to an MD (mini disc) player 63 through an optical fiber 62. On the other hand, a CD and DVD (digital versatile disc) player 64 is connected to an STB (set top box) 66 through an optical fiber 65. To connections between the optical fibers 62, 65 and the equipment are applied the optical connectors (not shown) with the combination of the plug and the receptacle of the invention.

FIG. 13 shows an example of the application to optical transmission in a game machine. In this example, a graphic display board 73 is connected to a main board 71 through an optical fiber 72, a sound source board 75 is connected to the main board 71 through an optical fiber 74, and a controller board 77 is connected to the main board 71 through an optical fiber 76. To connections between the optical fibers 72, 74, 76 and the boards are applied the optical connectors (not shown) with the combination of the plug and the receptacle of the invention. The main board 71 is connected to a power supply board 79 through an electric wire 78.

FIG. 14 shows an example of the application to optical transmission inside a pachinko machine (a kind of a game machine). In this example, a graphic display board 83 is connected to a main board 81 through an optical fiber 82, and a sound source board 85 is connected to the main board 81 through an optical fiber 84. To connections between the optical fibers 82, 84 and the boards are applied the optical connectors (not shown) with the combination of the plug and the receptacle of the invention. The main board 71 is connected to a delivery unit 87, a shooting unit 89, and a power supply board 91 through electric wires 86, 88, and 90, respectively.

In any of the examples, functions of the plug 1 and the receptacle 31 described above prevent such problems as failure of the optical element provided inside the receptacle and deterioration in transmission quality that might be caused by damage to the plug tip section. Thus reliability of optical transmission can be increased.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plug for an optical connector, which plug is to be combined with a receptacle having a plug insertion hole, the plug comprising:
   a plug tip section defining an optical reference plane that is to coincide with an optical reference plane in the receptacle;
   a first mechanical reference plane that is positioned a specified distance behind the optical reference plane of the plug tip section with respect to an insertion direction so as to be able to be brought into contact with an element within the receptacle such that the insertion of the plug in the receptacle is stopped when the first mechanical reference plane is brought into contact with the element; and
   a second mechanical reference plane that is positioned a specified distance behind the optical reference plane of the plug tip section with respect to the insertion direction so as to be able to be brought into contact with a front of the receptacle.

2. The plug as claimed in claim 1, wherein
   the distance between the optical reference plane defined by the plug tip section and the first mechanical reference plane is set at 5.4 mm; and
   the distance between the optical reference plane defined by the plug tip section and the second mechanical reference plane is set at 9.1 mm.

3. The plug as claimed in claim 1, wherein
   the plug tip section is cylindrical; and
   the plug has a cylindrical peripheral section coaxial with the plug tip section and having a diameter that allows the cylindrical peripheral section to be inscribed in a plug insertion hole of a rectangular receptacle defined in JEITA RC-5720B.

4. A receptacle that is usable in combination with the plug as claimed in claim 1 and that has a plug insertion hole, wherein a rear surface that is in depths of the plug insertion hole with respect to an insertion direction tapers off rearwards.

5. A receptacle that is usable in combination with the plug as claimed in claim 1 and that has a plug insertion hole, wherein:

the receptacle comprises, at an entrance of the plug insertion hole, a hinged shutter that is openable in contact with the plug tip section as the plug is inserted into the plug insertion hole;

the shutter has a groove in a front thereof, the groove extending in a direction perpendicular to a hinge pin of the shutter for guiding the plug tip section; and the groove has a tapered surface at an extremity thereof.

6. The receptacle as claimed in claim 5, wherein an edge of the tapered surface has an arc-shaped pattern bulging out.

7. The plug as set forth in claim 1, wherein the first mechanical reference plane is parallel with the optical reference plane.

8. An optical coimector including a receptacle having a plug insertion hole, and a plug, wherein the plug comprises:

a plug tip section defining an optical reference plane that is to coincide with an optical reference plane in the receptacle;

a first mechanical reference plane that is positioned a specified distance behind the optical reference plane of the plug tip section with respect to an insertion direction so as to be able to be brought into contact with an element within the receptacle such that insertion of the plug in the receptacle is stopped when the first mechanical reference plane is brought into contact with the element; and a second mechanical reference plane that is positioned a specified distance behind the optical reference plane of the plug tip section with respect to the insertion direction so as to be able to be brought into contact with a front of the receptacle.

9. The optical connector as claimed in claim 8, wherein in the receptacle, a rear surface that is in depths of the plug insertion hole with respect to an insertion direction tapers off rearwards.

10. The optical connector as claimed in claim 8 wherein the receptacle comprises, at an entrance of the plug insertion hole, a hinged shutter that is openable in contact with the plug tip section as the plug is inserted into the plug insertion hole;

the shutter has a groove in a front thereof, the groove extending in a direction perpendicular to a hinge pin of the shutter for guiding the plug tip section; and the groove has a tapered surface at an extremity thereof.

11. The optical connector as set forth in claim 8, wherein the first mechanical reference plane is parallel with the optical reference plane.

12. Electronic equipment comprising an optical connector that includes a receptacle having a plug insertion hole, and a plug, wherein the plug comprises:

a plug tip section defining an optical reference plane that is to coincide with an optical reference plane in the receptacle;

a first mechanical reference plane that is positioned a specified distance behind the optical reference plane of the plug tip section with respect to an insertion direction so as to be able to be brought into contact with an element within the receptacle such that insertion of the plug in the receptacle is stopped when the first mechanical reference plane is brought into contact with the element; and a second mechanical reference plane that is positioned a specified distance behind the optical reference plane of the plug tip section with respect to the insertion direction so as to be able to be brought into contact with a front of the receptacle.

13. The electronic equipment as claimed in claim 12 wherein in the receptacle, a rear surface that is in depths of the plug insertion hole with respect to an insertion direction tapers off rearwards.

14. The electronic equipment as claimed in claim 12 wherein the receptacle comprises, at an entrance of the plug insertion hole, a hinged shutter that is openable in contact with the plug tip section as the plug is inserted into the plug insertion hole;

the shutter has a groove in a front thereof, the groove extending in a direction perpendicular to a hinge pin of the shutter for guiding the plug tip section; and the groove has a tapered surface at an extremity thereof.

15. The electronic equipment as set forth in claim 12, wherein the first mechanical reference plane is parallel with the optical reference plane.

* * * * *